UNITED STATES PATENT OFFICE.

WILLIAM C. PORTER, OF BRIDGEPORT, CONNECTICUT.

IMPROVEMENT IN PAVING COMPOSITIONS.

Specification forming part of Letters Patent No. 157,418, dated December 1, 1874; application filed October 12, 1874.

*To all whom it may concern:*

Be it known that I, WILLIAM C. PORTER, of Bridgeport, in the county of Fairfield and in the State of Connecticut, have invented certain new and useful Improvements in Concrete Walks; and do hereby declare that the following is a full, clear, and exact description thereof.

My invention relates to the manufacture of a compound to be used in the laying of concrete sidewalks or pavements.

These sidewalks and pavements, as at present laid, are very apt to be hard and crumbly, or soft and yielding, while some of them are as good as could be desired. It is desirable to have them uniformly good—a result which I claim is easily and surely attained by my improvement.

My improvement consists in making a compound or artificial asphalt, consisting of tar, acid, lime, and oil, which I use in the place of tar alone, as at present.

The compound, in the formation of a walk, is mixed with sawdust, sand, or such other material as may be desirable for the body of the walk. I make the compound as follows:

The tar is first melted; the acid is then introduced in the proportion of about one part of acid to one hundred of tar. I generally use sulphuric acid. The lime is then introduced in quantity, whatever the mixture will readily absorb. When this is done put in three parts of oil to one hundred of tar. I usually use linseed-oil.

In making a walk or pavement this compound is remelted and mixed with sand, sawdust, or whatever is used for the body of the walk.

Having thus described my invention, what I claim as new, and for which I desire Letters Patent from the United States, is—

A concrete walk or pavement composed of tar, lime, acid, and oil, mixed with sawdust or sand, as set forth.

In testimony that I claim the foregoing I have hereunto set my hand this 12th day of August, 1874.

WILLIAM C. PORTER.

Witnesses:
 HENRY A. WHEELER,
 SAM. B. SUMNER.